Figures 1, 2:
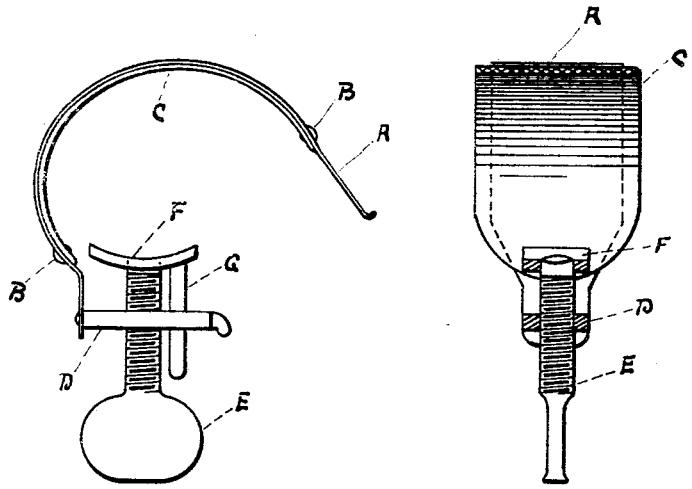

No. 625,257. Patented May 16, 1899.
W. W. GREEN.
CLAMP FOR STOPPING LEAKS IN HOSE, &c.
(Application filed June 19, 1898.)

(No Model.)

Witnesses
Paul Forwerg
E. O'Brien

William W. Green
Inventor

THE NORRIS PETERS CO., PHOTO-LITHO., WASHINGTON, D. C.

UNITED STATES PATENT OFFICE.

WILLIAM W. GREEN, OF CHICAGO, ILLINOIS.

CLAMP FOR STOPPING LEAKS IN HOSE, &c.

SPECIFICATION forming part of Letters Patent No. 625,257, dated May 16, 1899.

Application filed June 19, 1898. Serial No. 683,644. (No model.)

*To all whom it may concern:*

Be it known that I, WILLIAM W. GREEN, a citizen of the United States, residing at Chicago, in the county of Cook, State of Illinois, have invented a new and useful Clamp for Temporary Stoppage of Leaks in Hose or Pipe, of which the following is a specification.

My invention relates to improvements in a screw-clamp; and the objects of my improvement are to secure a tight joint at the place of rupture in a pipe, hose, or rubber tire and to do this quickly and easily without the use of any other mechanism or tools. I attain these objects by the mechanism illustrated in the accompanying drawings, in which—

Figure 1 is a side elevation of clamp. Fig. 2 is a vertical central section.

On the inside of the bent flexible steel band A is fastened, by rivets B, a band of rubber C of somewhat greater width. The cross-bar D is riveted on one end at right angles to one end of the steel band. The other end of cross-bar is provided with a catch or hook to fasten to other end of the steel band A. The center of the cross-bar is tapped for a thumb-screw E, which carries a swiveled curved following plate F at its upper end. Parallel to the thumb-screw E is a sliding pin G, riveted or fastened to following plate, but sliding through hole in cross-bar.

In applying the clamp to a leak it is adjusted over the pipe so that the thumb-screw is located opposite to the leak. After fastening spring-band into hook of cross-bar the thumb-screw is tightened. The rubber on inside of steel band will act as a cushion, while the steel band will prevent its elongation or rupture. By placing thumb-screw opposite leak a close contact will be made between clamp and pipe at or near the leak. If the clamp is applied to hose or pneumatic tire, the air or water pressure will further increase this contact. The sliding pin will prevent the following plate from turning, and thereby prevent any scratching or defacing of pipe, hose, or bicycle-rim. On pneumatic tires for bicycles the clamp is of particular advantage, as it can be applied instantly and by unskilled hands. If tire should become loose on the rim, its application will also prevent the tire from "creeping" and thereby cutting off the valve, rendering the tire useless. The rubber band in clamp is made somewhat wider, so that the edges of steel band will not cut into the hose or tire when applied.

I am aware that prior to my invention clamps for stoppage of leaks in pipes have been made; but

What I claim as new, and desire to secure by Letters Patent, is—

In a clamp for temporary stoppage of leaks in a pipe, hose or pneumatic tire, the combination of a flexible steel band lined with rubber or other yielding material, connected with thumb-screw provided with swiveled following plate and a sliding pin parallel to said thumb-screw all substantially as shown and for the purpose set forth.

WILLIAM W. GREEN.

Witnesses:
    PAUL FORWERG,
    E. D. GREEN.